(12) United States Patent  (10) Patent No.: US 8,605,860 B2
Campbell  (45) Date of Patent: *Dec. 10, 2013

(54) MULTI-RESOLUTION X-RAY IMAGE CAPTURE

(71) Applicant: William Eugene Campbell, Marietta, GA (US)

(72) Inventor: William Eugene Campbell, Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,364

(22) Filed: Feb. 4, 2013

(65) Prior Publication Data

US 2013/0148787 A1  Jun. 13, 2013

Related U.S. Application Data

(63) Continuation of application No. 12/876,402, filed on Sep. 7, 2010, now Pat. No. 8,369,483.

(51) Int. Cl.
*H05G 1/64* (2006.01)

(52) U.S. Cl.
USPC ............................................ 378/98.3

(58) Field of Classification Search
USPC ............ 378/62, 98.2, 98.3; 250/361, 363.02, 250/368, 370.08, 370.09, 370.11
See application file for complete search history.

(56) References Cited

U.S. PATENT DOCUMENTS

| | | | |
|---|---|---|---|
| 5,790,629 A | 8/1998 | Svensson et al. | 378/98.7 |
| 7,446,318 B2 | 11/2008 | Campbell | 250/368 |
| 7,825,382 B2 | 11/2010 | Campbell | 250/363.02 |
| 8,369,483 B2 * | 2/2013 | Campbell | 378/98.3 |
| 2007/0145282 A1 | 6/2007 | Campbell | 250/370.11 |

* cited by examiner

*Primary Examiner* — Courtney Thomas
(74) *Attorney, Agent, or Firm* — Thomas | Horstemeyer, LLP.

(57) ABSTRACT

Various methods and systems are provided for multi-resolution x-ray image capture. In one embodiment, a method includes repositioning an image capture assembly of an x-ray image capture apparatus from a first position to a second position, the first position corresponding to a first pixel density resolution and the second position corresponding to a second pixel density resolution; activating an x-ray source; and obtaining a digital x-ray image of a subject from an imaging sensor of the image capture assembly, the digital x-ray image having the second pixel density resolution.

20 Claims, 6 Drawing Sheets

MULTI-RESOLUTION X-RAY IMAGE CAPTURE

CROSS REFERENCE TO RELATED APPLICATIONS

This patent application is a continuation of patent application Ser. No. 12/876,402 entitled "MULTI-RESOLUTION X-RAY IMAGE CAPTURE", filed Sep. 7, 2010, the entirety of which is hereby incorporated by reference.

BACKGROUND

X-ray images are conventionally taken with film in medical radiography. To avoid the use of film, the images may be digitally generated using an imaging plate in a process called computed radiography. Alternatively, an imaging sensor may be used to capture an x-ray image through direct digital radiography as described in U.S. Pat. No. 7,446,318, entitled "Remote triggered X-ray image capture device", issued on Nov. 4, 2008; U.S. Patent Application Publication 2007/0145282, entitled "Remote triggered X-ray image capture device", filed on Dec. 22, 2005; and U.S. Patent Application Publication 2009/0016490, entitled "Remote triggered X-ray image capture device with gamma ray detector", filed on Jun. 13, 2008; all of which are hereby incorporated by reference in their entirety.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of systems and methods related to multi-resolution x-ray image capture. Reference will now be made in detail to the description of the embodiments as illustrated in the drawings, wherein like reference numbers indicate like parts throughout the several views.

Figure 1:
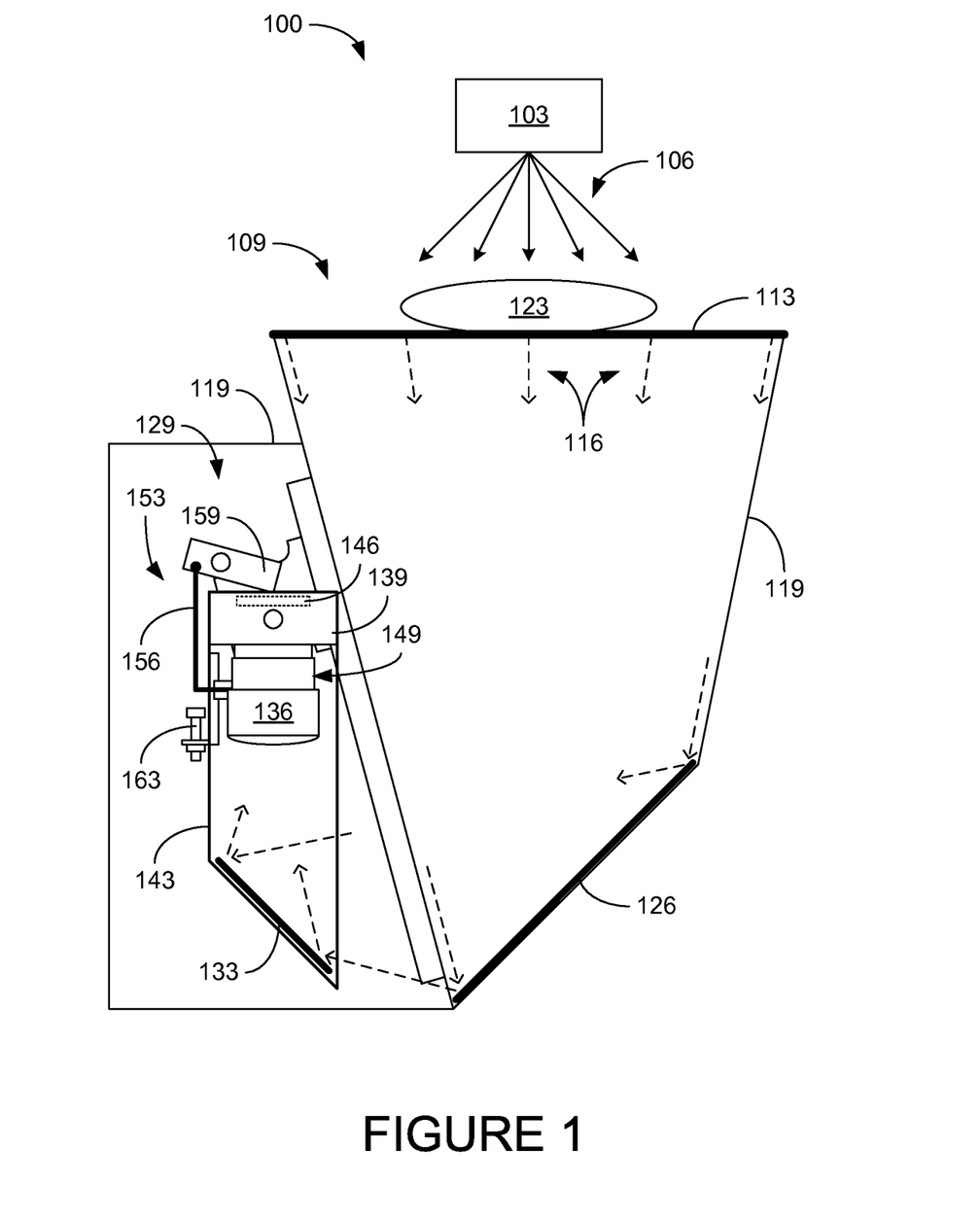
FIGS. 1 and 2 are cross-sectional views of an x-ray capture system according to various embodiments of the present disclosure.

With reference to FIG. 1, a multi-resolution x-ray capture system 100 is illustrated in accordance with various embodiments of the present disclosure. The multi-resolution x-ray capture system 100 includes an x-ray source 103 for generating x-rays 106 and a multi-resolution x-ray image capture device 109. X-rays are electromagnetic radiation with a wavelength in the range of about 10 nanometers to about 100 picometers, which corresponds to a frequency range of about 30 PHz (petahertz) to about 3 EHz (exahertz). When activated, the x-ray source 103 directs the generated x-rays 103 towards a screen 113 of the multi-resolution x-ray image capture device 109. A trigger is integrated with the multi-resolution x-ray capture system 100 to activate the x-ray source 103 and to indicate to the electronics in the enclosure that a user has elected to generate an x-ray.

The screen 113, sometimes referred to as an intensifying screen, converts the highly energetic x-rays into less energetic photons of light 116 such as, but not limited to, fluorescent light. In some embodiments, the light 116 may be in the visible, the infrared, or the ultraviolet spectrum, or some combination thereof. The screen 113 generally contains, among other ingredients, a layer of phosphor crystals. When an x-ray 106 strikes a phosphor crystal, the phosphor crystal absorbs the x-ray 106 and emits a number of light photons 116 from the screen 113. Types of phosphors that may be used to create a screen 113 for use in the x-ray image capture device 109 include, but are not limited to, calcium tungstate ($CaWO_4$) and various rare earths. Among the rare earths, gadolinium oxysulfide and thallium-doped cesium iodide are examples of substances that are suitable for use in screen 113. However, other substances that convert x-rays 106 into light photons 116, such as metal screens, may also be utilized. The size of the individual phosphor crystals and thickness of the phosphor crystal layer are factors that affect the level of detail in the eventual x-ray image. The larger the individual crystal and the thicker the layer, the more spread-out the individual light photons are that are generated by the phosphor crystal. The image detail can be degraded by the size of the light spread, as the same amount of information is smeared over a larger area.

The multi-resolution x-ray image capture device 109 also includes a beam enclosure unit 119. The screen 113 is mounted over an aperture of the beam enclosure unit 119. The aperture dimensions of the beam enclosure unit 119 may be any size, ranging from less than millimeter ranges to more than several feet. For example, sizes suitable for a wide variety of x-ray applications such as intra-oral or dental x-rays (e.g., about 12 mm by 16 mm or smaller), x-rays suitable for large animals (e.g., up to about 17 inches by 17 inches or larger), or more powerful x-rays for non-destructive testing are all envisioned.

When an x-ray 106 strikes the phosphor of the screen 113, light photons 116 are emitted into the beam enclosure unit 119. Only a portion of the x-rays 106 will be absorbed by the screen 113, causing light photons 116 to be emitted. For example, if calcium tungstate is used, approximately 20 to 40 percent of the incident x-rays 106 will be absorbed; while the bulk of the rest will pass through the screen 113 into the beam enclosure unit 119. In comparison, rare earth screens absorb approximately 60 percent of the x-rays 106. Furthermore, the efficiency of calcium tungstate screens at converting x-rays 106 into light 116 is approximately one-third to one-fourth that of rare earth screens. However, each material may be used in various embodiments.

The beam enclosure unit 119 is sealed to eliminate outside light during acquisition of the x-ray image. In some embodiments, the beam enclosure unit 119 is hermetically sealed to eliminate ambient light from entering the beam enclosure unit 119. For example, the multi-resolution x-ray image capture device 109 may include a light-tight cover to reduce the external light entering the beam enclosure unit 119. The light-tight cover may also act as a support for the screen 113. In one embodiment, the screen 113 is bonded to the light-tight cover. The light-tight cover may be any low molecular weight material such as aluminum, carbon fiber, plastic, or foam that minimizes x-ray absorption. The light-tight cover may be bolted around its perimeter to the beam enclosure unit 119 with tamper-proof screws. Alternatively, in some embodiments, the light-tight cover can be bonded in place or held by a clamping mechanism.

Heat generated by electronic components operating inside the multi-resolution image capture device 109 is removed from the beam enclosure unit 119. A liquid based system may be used to transport the heat generated by the electronics associated with the multi-resolution image capture device 109 from the inside of the beam enclosure unit 119 to the outside while maintaining the light blocking and air blocking integrity of the beam enclosure unit 119. For example, a hydraulic heat transfer system utilizing water (e.g., distilled water), ethanol, alcohol, or anti-freeze (e.g., ethylene glycol) may be used to remove heat from the electronic components inside the beam enclosure unit 119. For example, a peltier cooler may be attached to an image acquisition device such as, but not limited to, a charged coupled device (CCD). The peltier cooler is a solid state device that uses bi-metal interaction to cool one side (a cool side) of a bi-metal strip and transfer that heat to the opposite side (a warm side) of the bi-metal strip. The coolant caries the heat from the warm side out to a radiator and fan assembly, which cools the heated coolant with ambient air to remove the accumulated heat from the coolant.

The beam enclosure unit 119, depicted in the exemplary embodiment of FIG. 1, may be installed on a support mechanism such as, but not limited to, under a table top. A variety of mounting devices, adapted to each type of support mechanism, may be used in the installation. The beam enclosure unit 119 may be installed such that the weight of the multi-resolution x-ray image capture device 109 is supported and such that the x-ray beam 106 is appropriately aligned during exposure. The support mechanism may also allow for freedom of motion of the table top, allowing for position adjustment of a subject 123 with respect to the x-ray source 103. In other embodiments, the beam enclosure unit 119 may be installed without a table present. Alternative embodiments may have the beam enclosure unit 119 installed on a wall stand for vertical imaging.

The multi-resolution x-ray image capture device 109 also includes a first mirror 126 and an image capture assembly 129. The first mirror 126 is located within the beam enclosure unit 119 on a side opposite the aperture and fixed in position at an angle from the plane of the screen 113. In the exemplary embodiment of FIG. 1, the first mirror 126 is fixed in position at an angle that is substantially 45 degrees from the plane of the screen 113. Other angles of mounting may also be utilized in other embodiments. For example, angles in the range of about 20 degrees to about 70 degrees may be used.

The image capture assembly 129 is located within the beam enclosure unit 119 and includes a second mirror 133, an accumulator (or lens) 136, and an imaging sensor 139. The image capture assembly 129 includes a yoke assembly 143 that can pivot about a rotational axis. The second mirror 133 is affixed to the yoke assembly 143. The mirrors 126 and 133 may be enhanced by surface preparation to provide additional light reflection when mounted at an angle with respect to an incident light beam (e.g., mounting angles between about 30 degrees and about 60 degrees to the incident light beam, between about 40 degrees and about 50 degrees to the incident light beam, or between about 43 degrees and about 47 degrees to the incident light beam). For example, the mirror may be aluminum-enhanced and/or micro- or pico-ground. In one embodiment, the mirrors 126 and 133 may reflect in excess of 97.5% if the available light.

The yoke assembly 143 also supports the accumulator (or lens) 136 and the imaging sensor 139. Because of the destructive nature of the x-rays, the imaging sensor 139 is placed out of the direct path of the x-rays from x-ray source 103 and shielded from the x-ray energy by substantial amounts of steel and/or lead. The steel and/or lead protection may be mounted to the yoke and moves with the accumulator 136 and imaging sensor 139 to provide protection from radiation at all angles. Because of the location of the imaging sensor 139 and the shielding in relation to the x-rays in the beam enclosure unit 119, steel can be used for the shielding rather than the more common lead. Additional shielding may be placed along other areas where x-rays may penetrate toward the imaging sensor 139.

With the image capture assembly 129 in a lower-resolution position, as depicted in FIG. 1, the second mirror 133 is at substantially a 90 degree angle (or substantially perpendicular) to the first mirror 126. Other angles of mounting may also be utilized in other embodiments such that the combination of angles is about 90 degrees. This creates an imaging path from the screen 113 to the imaging sensor 139 such that an image traveling along the imaging path is reflected by the first and second mirrors (126 and 133 respectively) and through the accumulator (lens) 136, which may be designed to minimize quantum efficiency loss and provide an optically flat field. In one embodiment, a first segment of the light image crosses a second segment of the light image at least once along the imaging path.

As depicted in FIG. 1, the light photons 116 are reflected by the first mirror 126 to the second mirror 133 when the image capture assembly 129 rotated to the lower-resolution position. The degree of reflection depends upon where along the surface of the first mirror 126 the light photons 116 hit, with photons 116 hitting the section of the first mirror 126 furthest from the screen 103 being reflected at a more acute angle. When the light photons 116 hit the second mirror 133, they are reflected towards the accumulator (lens) 136 and the imaging sensor 139. As shown in FIG. 1, the imaging path for the system is folded such that the light photons striking the first mirror 126 are reflected such that at least some of the light photons cross paths on their way to the second mirror 133. Photons 116 hitting the section of the second mirror 133 furthest from the accumulator 136 reflect at a more obtuse angle than those that hit the section of the second mirror 133 closest to the accumulator 136. Thus, the imaging path is folded a second time such that at least some of the light photons cross paths on their way to the imaging sensor 139. Other embodiments can employ imaging paths that bend the light multiple times.

Complex angles of mirrors may also be utilized to relocate the imaging sensor 139. For example, the second mirror may be at a vertical angle of 45 degrees and a left/right angle of 45 degrees to the first mirror. Additional mirrors may be added to bend the light through an additional 90 degrees. In other embodiments, a fiber-optic coupler may be added to the imaging sensor side of the accumulator 136. The fiber-optic coupler may then be routed through a number of angles to the imaging sensor 139 for protection of the electronics from radiation.

In the embodiment of FIG. 1, the imaging sensor 139 includes an image acquisition device such as, but not limited to, a charged coupled device (CCD) 146. Light photons 116 traveling along the imaging path are focused on the CCD 146 such that, when triggered, a view of screen 103 is captured. In an alternate embodiment, the image acquisition device is a complementary metal oxide semiconductor (CMOS) device in lieu of the CCD 146. Other image acquisition devices with the same functionality may also be used such as, but not limited to, thin film transfer (TFT) devices. In other embodiments, more than one image acquisition device is employed. In some embodiments, a view of substantially the entire screen 103 may be captured by the image acquisition device.

When the imaging sensor 139 is triggered, each pixel that makes up a light-measuring array in the CCD 146 (or other image acquisition device) is struck by some number of light photons, which are converted to a corresponding charge value. The charge value may then be converted into as digital value that is associated with a specific grayscale value to form a detailed x-ray image. In a grayscale digital image, the image is represented as a grid of pixels, each pixel having a value representing a shade of gray. Possible digital representations for the original capture comprise 8 bit, 12 bit, 16 bit, or a different resolution. For example, a 16-bit conversion at each pixel can result in a grayscale depth of over 65,000 distinct shades of gray being converted into the eventual image. In contrast, a monochromatic image is considered a 1-bit grayscale or a binary image that contains only black and white pixels. In another embodiment, the imaging sensor 139 records the images in color, with each digital value (or a range of values) associated with a specific color, using some color space to assign specific values to the pixels. Examples of exemplary color spaces include, but are not limited to, RGB, CMY, CMYK, HSV, and HLS.

The accumulator (lens) 136 is positioned between the second mirror 133 and the imaging sensor 139 to focus the light photons 116 on the face of the CCD 146 or CMOS device. The position of the accumulator 136 may be adjusted relative to the face of the CCD 146 to control focus. An adjustable light shield 149 may be connected between the accumulator 136 and the imaging sensor 139 to reduce the amount of ambient light (not reflected by the second mirror 133) that reaches the CCD 146.

The image capture assembly 129 may include a focus adjustment mechanism 153 to adjust the accumulator position. In the embodiment of FIG. 1, the focus adjustment mechanism 153 includes a transfer rod 156 connected between the accumulator (lens) 136 and a counterweight 159 attached to the yoke assembly 143. The transfer rod 156 may be a threaded connection rod connected through ball joints and/or linkages between the counterweight 159 and the accumulator 136. In one embodiment, the transfer rod 156 is connected to a carriage of a lens holder to which the accumulator (lens) 136 is detachably attached.

The accumulator 136 may be supported by a truck and rail system, which is affixed to the yoke assembly 143, to restrict movement of the accumulator 136 along its axis. In one embodiment, transfer rod 156 is attached to the truck of the truck and rail system. In alternative embodiments, the focus adjustment mechanism 153 may comprise electric, pneumatic, or hydraulic motors, gearing, and/or solenoids to adjust the position of the accumulator (lens) 136. For example, a linear stepper motor may be utilized to adjust accumulator position. Mechanical stops and/or limit switches may be used to restrict movement of the accumulator 136.

Figure 2:
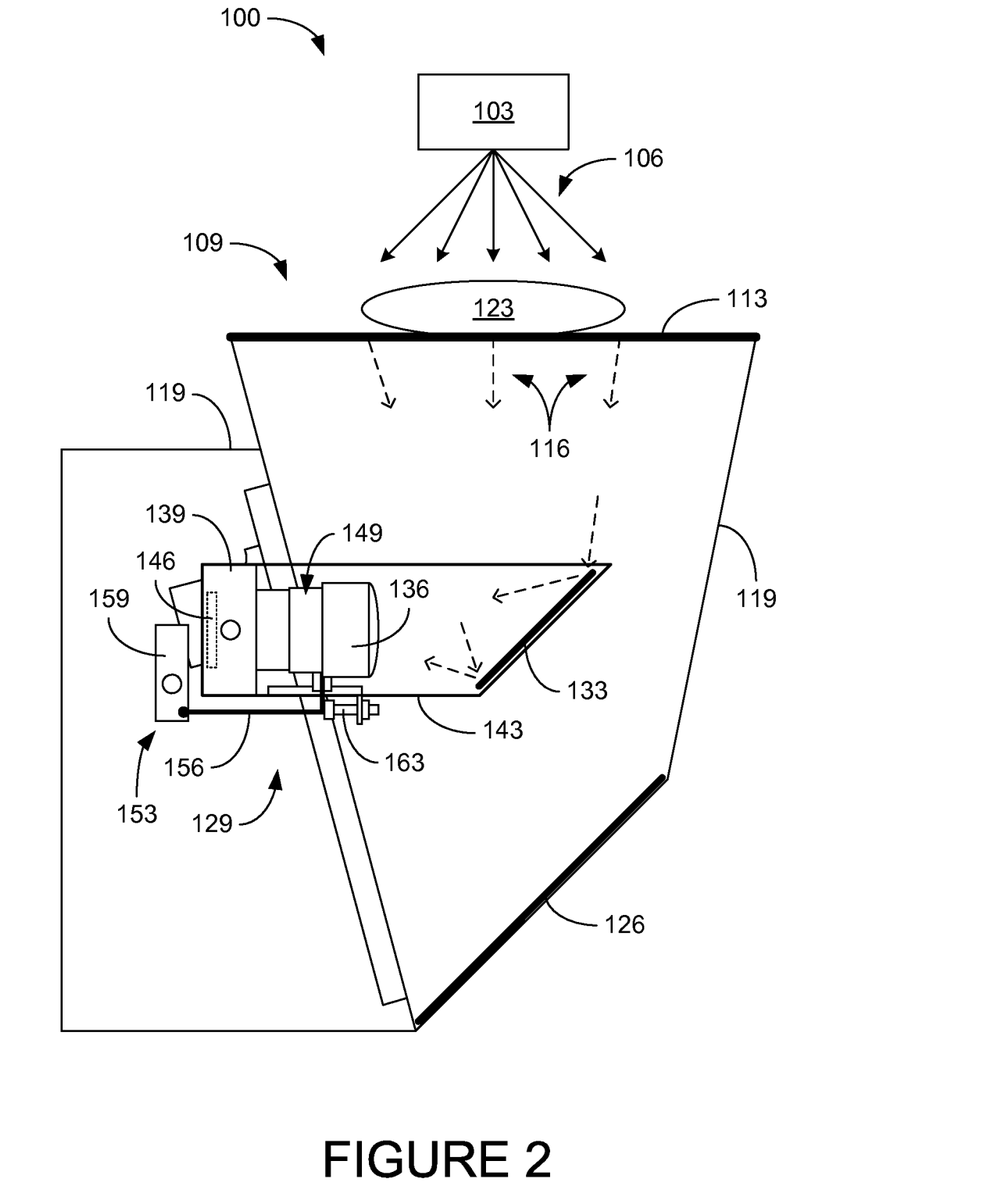

Referring next to FIG. 2, the multi-resolution x-ray capture system 100 of FIG. 1 is illustrated with the image capture assembly 129 rotated to a high-resolution position. A pivot mechanism can be used to rotate the image capture assembly 129 between the high-resolution position of FIG. 2 and the lower-resolution position of FIG. 1 as desired by the user. In one embodiment, the pivot mechanism is a reversible electric motor that is connected to the yoke assembly 143 via a shaft. The electric motor is activated to rotate the image capture assembly 129 between the two positions. In other embodiments, the image capture assembly 129 may be rotated using a pneumatic motor, a hydraulic motor, and/or manually driven gearing. Limit switches and/or mechanical stops may be included to provide proper positioning of the yoke assembly 143, and thus the second mirror 133, accumulator (lens) 136, and imaging sensor 139. In some embodiments, the rotation is accurate to about 0.002 of a degree.

With the image capture assembly 129 in a high-resolution position, as depicted in FIG. 2, the second mirror 133 is positioned at an angle that is substantially 45 degrees from the plane of the screen 113. Other angles of mounting may also be utilized in other embodiments such as, but not limited to, angles between about 30 degrees and about 60 degrees. This creates an imaging path from the screen 113 to the imaging sensor 139 such that an image traveling along the imaging path is reflected by the second mirror 133 and through the accumulator (lens) 136. The adjustable light shield 149 reduces the amount of ambient light (not reflected by the second mirror 133) that reaches the CCD 146 of the imaging sensor 139.

In this embodiment, a first segment of the light image crosses a second segment of the light image once along the imaging path. In addition, when the image capture assembly 129 is rotated through a 90 degree arc, the working distance of the imaging path is effectively reduced. For example, the length of the imaging path in the high-resolution position may be reduced to approximately a third of the imaging path length in the lower-resolution position. In one embodiment, the length of the imaging path is reduced from about 22 inches in the lower-resolution position to about 9 inches in the high-resolution position. In an exemplary embodiment, this reduces the x-ray image field of view at the screen 113 from about 14 inches by 17 inches in the lower-resolution position of FIG. 1 to about 7 inches by 7 inches in the high-resolution position of FIG. 2.

Rotation of the image capture assembly 129 from the lower-resolution position to the high-resolution position concentrates all of the available pixels of the CCD 146 onto a subsection of the screen 113, thus significantly improving the image resolution. For example, a pixel density of 33,193 pixels per square inch is achieved if 7,900,000 pixels of the CCD 146 are used to obtain an image over the exemplary 14 inch by 17 inch field of view. In contrast, shifting to the high-resolution position allows 9 megapixels of the CCD 146 to obtain an image over the exemplary 7 inch by 7 inch high-resolution field of view, producing a pixel density of 183,673 pixels per square inch. Other resolution combinations are possible based upon factors such as the length of the imaging path, number and size of mirrors, and pixel density of the CCD 146, CMOS device, etc.

The position of the accumulator 136, relative to the face of the CCD 146, is adjusted to control focus in response to the repositioning of the image capture assembly 129. In the embodiments of FIGS. 1 and 2, such adjustment is constrained by the transfer rod 156 and the truck and rail system. Limit switches and/or stops (e.g., stop 163 including a threaded bolt, nut(s), and anchor) may further limit accumulator adjustment. The counterweight 159 is eccentrically balanced so that, when in the lower-resolution position of FIG. 1, the weight of the counterweight pulls the accumulator 136 towards the imaging sensor 139. To fix the focus of the accumulator (lens) 136 in this position, one or more stops may be adjusted. When the image capture assembly 129 is rotated to the high-resolution position of FIG. 2, the counterweight 159 over centers and pushes the accumulator (lens) 136 away from the imaging sensor 139. Mechanical stop 163 is used to prevent movement of the accumulator 136 past the position where the x-ray image is focused on the face of the CCD 146. The stop 163 may be adjusted to tune the image focus.

Figure 3:
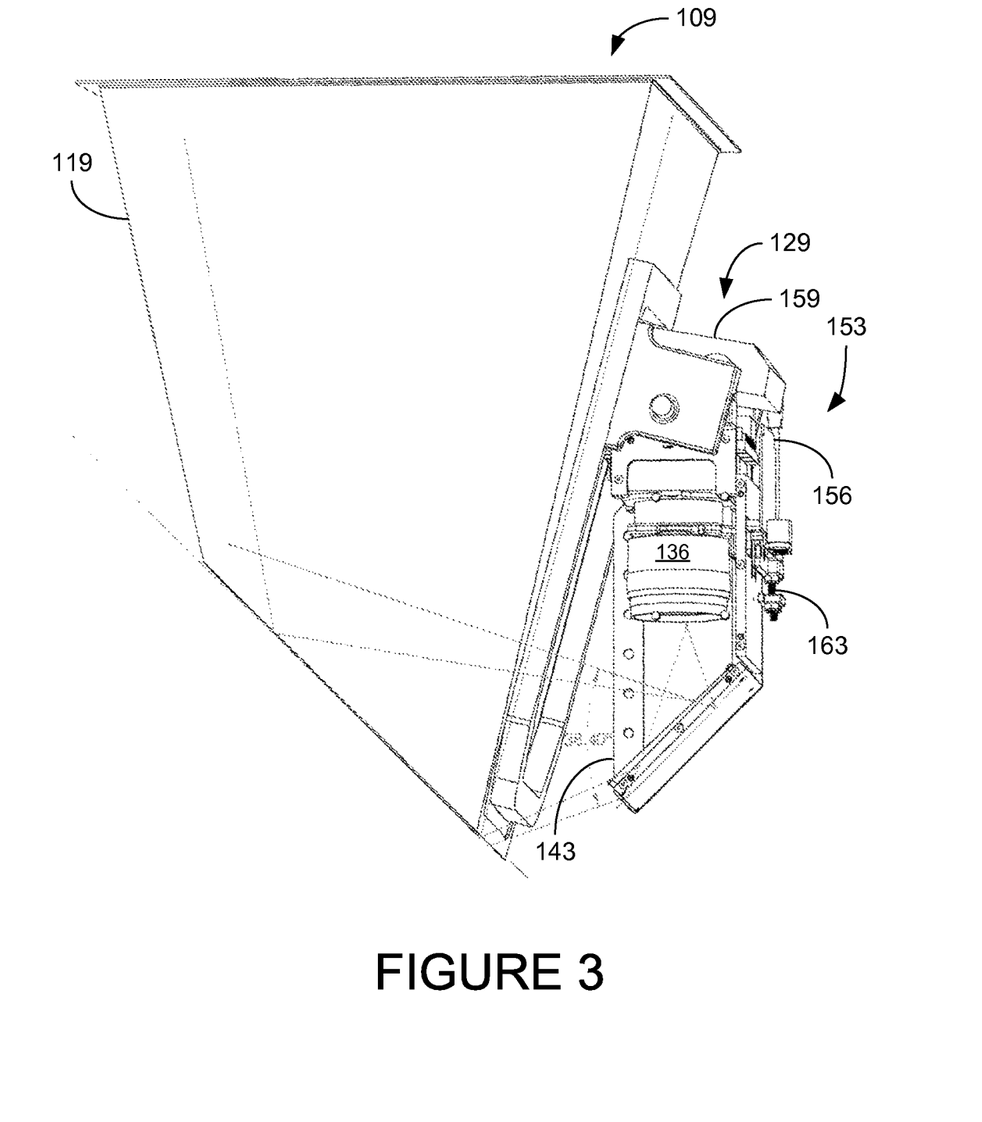
FIGS. 3 and 4 illustrate three-dimensional cutaway views of an exemplary multi-resolution x-ray image capture device of FIGS. 1 and 2 according to various embodiments of the present disclosure.
Figure 4:
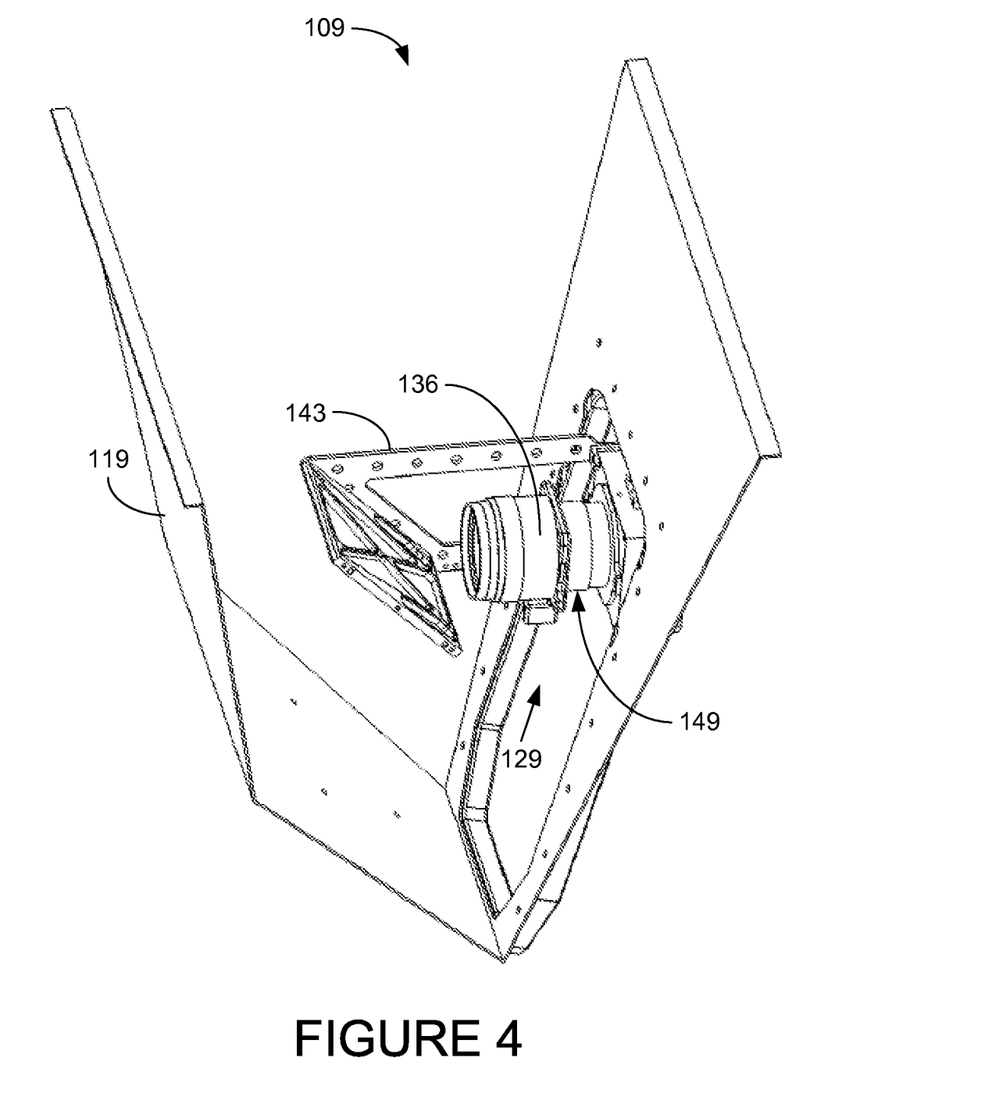

Referring to FIGS. 3 and 4, shown are three-dimensional cutaway views of an exemplary multi-resolution x-ray image capture device 109 of FIGS. 1 and 2. In FIG. 3, the image capture assembly 129 is positioned in the lower-resolution position of FIG. 1. FIG. 4 illustrates an internal cutaway view of the enclosure unit 119 with the image capture assembly 129 positioned in the high-resolution position of FIG. 2. In the exemplary embodiment of FIGS. 3 and 4, portions of the image capture assembly 129 have been cut away for illustration of internal components of the image capture assembly 129. In addition, the portion of the enclosure unit 119 surrounding the image capture assembly 129 is not shown.

Figure 5:
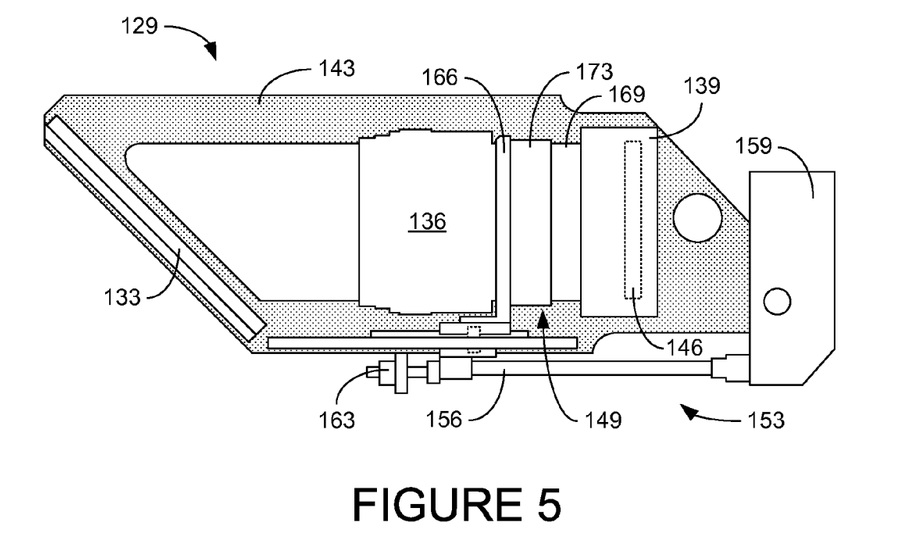
FIG. 5 is a cutaway view of an exemplary image capture assembly of FIGS. 1 and 2 according to various embodiments of the present disclosure.

Referring now to FIG. 5, shown in a cutaway view of an exemplary image capture assembly 129 according to various embodiments of the present disclosure. In the embodiment of FIG. 5, the accumulator (lens) 136 is detachably attached to a lens holder 166. For example, the lens holder 166 may be configured to accept an F-mount ring of a camera lens. The carriage of the lens holder 166 and the accumulator 136 are supported by a truck and rail system, which is affixed to the yoke assembly 143, using fasteners as appropriate. The transfer rod 156 is attached to the truck of the truck and rail system through ball joints and/or linkages. Rotation of the image capture assembly 129 causes that counterweight 159 to shift about its pivot point, as described above, thereby shifting the position of the accumulator (lens) 136 along the rail. Support for the image capture assembly 129 is provided by the yoke assembly 143, which can include a first yoke, a second yoke (not shown), and cross bracing between the yokes.

An adjustable light shield 149 may be connected between the accumulator 136 and the imaging sensor 139 to reduce the amount of ambient light (not reflected by the second mirror 133) that reaches the CCD 146. In the embodiment of FIG. 5, the adjustable light shield includes two concentric tubes. A first tube 169 is fixed in position by its connection with the imaging sensor 139. A second tube 173 is attached to the lens holder 166 and slides over the first tube 169. Overlap of the first and second tubes 169 and 173 blocks the ambient light from the CCD 146. Other types of adjustable light shields include, but are not limited to, accordion sleeves attached between the accumulator 136 and the imaging sensor 139.

Coordination of the multi-resolution x-ray capture system 100 is provided by a control system in communication with the multi-resolution x-ray image capture device 109. The control system determines when to trigger the CCD 143 of the imaging sensor 139 based upon information received from the x-ray source 103 and/or the multi-resolution x-ray image capture device 109. When the control system registers the appropriate conditions, an activation command is sent to the CCD 143 to "snap the picture." For example, signals from the image capture assembly 129 (e.g., rotational speed, angular position, and/or rotational limit) can indicate that adequate positioning has been achieved and signals from an operator hand switch and/or foot switch can indicate that the operator desires an image to be acquired. The digital image obtained by the CCD 143 is transferred to the control system using a connection such as, but not limited to, a serial or USB, or a wireless connection such as WiFi or bluetooth. In some embodiments, the image information is transferred over a network connection. The control system processes the image data obtained by the CCD 143 for display to the user on a display device.

Figure 6:
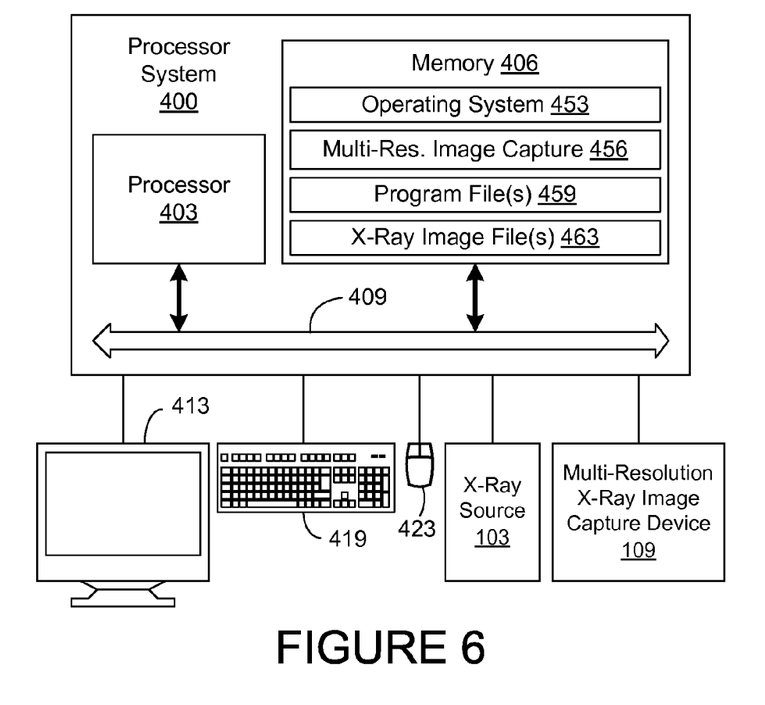
FIG. 6 illustrates an exemplary processor system that performs various functions related to multi-resolution x-ray image capture according to the various embodiments of the present disclosure.

FIG. 6 illustrates one example of a control system that performs various functions related to multi-resolution x-ray image capture according to the various embodiments as set forth. As shown, a processor system 400 is provided that includes a processor 403 and a memory 406, both of which are coupled to a local interface 409. The local interface 409 may be, for example, a data bus with an accompanying control/address bus as can be appreciated by those with ordinary skill in the art. The processor system 400 may comprise, for example, a computing device such as a desktop computer, laptop, personal digital assistant, server, or other system with like capability.

Coupled to the processor system 400 are various peripheral devices such as, for example, a display device 413, a keyboard 419, and a mouse 423. In addition, other peripheral devices may be coupled to the processor system 400 such as, for example, an x-ray source 103 and a multi-resolution x-ray image capture device 109. Other command input devices such as, but not limited to, push button activators may also be coupled to the processor system 400.

Stored in the memory 406 and executed by the processor 403 are various components that provide functionality according to the various embodiments of the present invention. In the example embodiment shown, stored in the memory 406 is an operating system 453 and a multi-resolution image capture application 456. In addition, stored in the memory 406 may be various program files 459 and x-ray image files 463. The program files 459 may be include various programs for processing and analysis of captured x-ray images. Processing may be provided which allows an x-ray image to be transferred to a different system, or which stores the x-ray image in a standard format, such as DICOM, RAW, CMP, PNG, JPEG, TIFF, GIF, or other widely-available format. Some embodiments may include algorithms which store the images in a proprietary format, the proprietary format being a format used by a single vendor or a limited number of vendors. The x-ray image files 463 may be associated with corresponding subjects 123. The program files 459 and the x-ray image files 463 may be stored in an external storage device (not shown) as needed.

The multi-resolution image capture system 456 is executed by the processor 403 in order to capture x-ray images as described. A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a of random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The processor 403 may be of electrical, optical, or molecular construction, or of some other construction as can be appreciated by those with ordinary skill in the art.

The operating system 453 is executed to control the allocation and usage of hardware resources such as the memory, processing time and peripheral devices in the processor system 400. In this manner, the operating system 453 serves as the foundation on which applications depend as is generally known by those with ordinary skill in the art. The multi-resolution image capture system 456 may be implemented using any one of a number of programming languages such as, for example, C, C++, or other programming languages. In some embodiments, the functionality of the multi-resolution image capture system 456 may be implemented, for example, in an object oriented design or in some other programming architecture.

The processor system 400 may operate in a networked environment using logical connections to one or more remote devices such as a computer, a server, a router, a network PC, or a peer device or other common network node. Logical connections can include a local area network (LAN) and/or a wide area network (WAN). Such networking environments are commonplace in offices, enterprise-wide computer networks, intranets, and the Internet.

Figure 7:
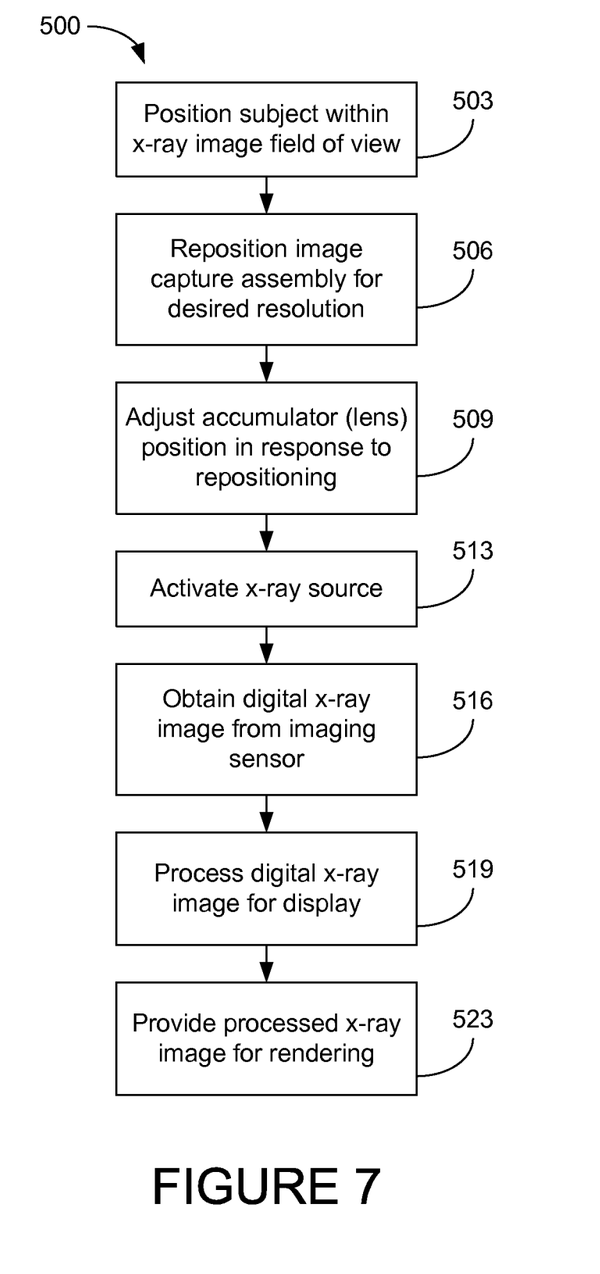
FIG. 7 is a drawing of a flowchart that illustrates functionality of the x-ray capture systems of FIGS. 1-5 in accordance with various embodiments of the present disclosure.

Referring next to FIG. 7, shown is a flowchart 500 that illustrates functionality of the x-ray capture system of FIGS. 1-5 in accordance with various embodiments of the present disclosure. To begin, a subject 123 (FIGS. 1-2) is positioned within an x-ray image field of view on the screen 113 (FIGS. 1-2) in block 503. The subject 123 may be of an adult human or child, or of an animal, such as would be seen in a veterinary practice. The animal may be very large, such as a horse, or much smaller, such as a ferret. Subjects 123 may also include other biologic material (e.g., processed food) or non-biologic material such as that evaluated using non-destructive testing. The x-ray image field of view may be indicated on the screen 113 for proper positioning of the subject 123.

The image capture assembly 129 (FIGS. 1-5) is repositioned from a first position to a second position in block 506 to obtain the desired pixel density resolution for the x-ray image. For example, the image capture assembly 129 may be repositioned from the high-resolution position illustrated in FIG. 2 to the lower-resolution position illustrated in FIG. 1 or, alternatively, from the lower-resolution position of FIG. 1 to the high-resolution position of FIG. 2. This may be accomplished using a pivot mechanism such as, but not limited to, a reversible electric motor coupled to the yoke assembly 143 (FIG. 1-2) through a shaft and/or gear assembly. Control of the pivot mechanism may be provided through a control system such as that illustrated in FIG. 6.

While the disclosure discusses the operation of the multi-resolution x-ray capture system 100 with respect to a high-resolution position and lower-resolution position, it should be understood that multiple resolution positions are possible. For example, a second lower-resolution position may be provided by including a third mirror that is positioned at 90 degrees from the first mirror and rotating the image capture assembly 129 90 degrees clockwise from the position illustrated in FIG. 1 (rotation away from the high-resolution position of FIG. 2). This creates an imaging path from the screen 113 to the imaging sensor 139 such that an image traveling along the imaging path is reflected by the first mirror 126, the third mirror, and the second mirror 133, and through the accumulator (lens) 136. By increasing the length of the imaging path, it is possible to provide a third image resolution with a further reduced pixel density.

In block 509, the position of the accumulator (lens) 136 (FIG. 1-2) is adjusted to focus the x-ray image on the face of the CCD 146 (FIG. 1-2) in response to repositioning the image capture assembly 129. Adjustment of the accumulator 136 is accomplished by a focus adjustment mechanism 153 (FIG. 1-2). In one embodiment, the focus adjustment mechanism 153 includes an eccentrically balanced counterweight 159 that pivots during repositioning of the image capture assembly 129 to adjust the position of the accumulator 136 through a transfer rod 156. In other embodiments, the focus adjustment mechanism 153 includes a motor that is controlled to adjust the position of the accumulator 136. The motor may be a linear motor or a stepper motor utilizing a screw and/or gearing to reposition the accumulator 136. Alternative embodiments may use a solenoid or hydraulic/pneumatic cylinder to adjust accumulator position. Adjustment of the accumulator 136 may be controlled using limit switches, sensors, and/or mechanical stops. A control system, such as the processor system 400 of FIG. 6, may also provide control signals to the focus adjustment mechanism 153 based upon indications from limit switches and/or sensors.

The x-ray source 103 (FIGS. 1-2) may then be activated in block 513 and a digital x-ray image obtained from the imaging sensor 139 (FIGS. 1-2) in block 516. The x-ray source 103 may be activated from the control system, such as the processor system 400 of FIG. 6, or from a separate remote control device. The screen 113 (FIGS. 1-2) transforms the x-rays 106 into light photons 116 prior to the x-ray image being captured by the CCD 143 (or other device) of the imaging sensor 139. Positioning of the image capture assembly 129 determines the length of the imaging path and the pixel-density resolution of the captured image. The control system determines when to trigger the CCD 143 based upon information received from the x-ray source 103 and/or the multi-resolution x-ray image capture device 109. For example, a detection device may be included within the beam enclosure unit 119 for detection of x-rays or light photons to indicate when the x-ray source 103 is activated. After triggering the CCD 143, the captured image data is transferred to the control system for processing in block 519.

The image processing may include turning the digital representation into an image that can be viewed on a screen, and may include certain modifications to the image, as are known to those of skill in the art. For example, if the image was initially exposed for too long and is too dark, an algorithm may be employed which "lightens" the image, making it easier to read. In some embodiments, an algorithm may be employed on some images to sharpen specific areas, increasing contrast over what would otherwise be seen. A variety of other visualization techniques may be used as well, such as edge enhancement, sharpening, histogram equalization, image subtraction, addition and division, zooming, maximum intensity projection, perspective viewing, and the like.

In some embodiments, the actual x-ray image data may not take up the entire captured x-ray image, i.e., there may be dark areas without data along the edges of the captured image. The image processing may also include an edge location and an angle determination which crop the actual x-ray data from the captured image such that junk data values along the edge (representing non-exposed portions of the x-ray) are removed. The captured image can be cropped to aid in further enhancement of the x-ray image based upon evaluation of the darkness of the pixels and location of edges of the image data. Resolving the original grayscale (or color) representation to a lower resolution image may be utilized to make the differences between the data and the unexposed edges clearer. Even though the exact size and angulation of the X-ray data may not be known, the data itself is expected to be rectangular. Therefore, some embodiments include squaring off the edges that have been located; that is finding data points along at least two edges and the connecting the points in such a way that a rectangular image is determined. Other embodiments may also allow the grayscale of the image to be modified, for example, from a 16 bit grayscale image to a 1 bit grayscale image.

The processed x-ray image may then be provided for rendering in block 523. The processed x-ray image may then be presented to the user on a display device. In one embodiment, the user may select portions of the processed x-ray image for further enhancement and/or enlargement. In other embodiments, the processed image may be sent through a network to another network device or through a wireless connection to a portable communication device such as a PDA, an internet-enabled cell phone, or a laptop computer.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A multi-resolution x-ray image capture apparatus, comprising:
   an image capture assembly comprising:
      an imaging sensor;
      an accumulator; and
      a focus adjustment mechanism configured to adjust a position of the accumulator between a first position and a second position, where the imaging sensor is configured to acquire a high-resolution digital x-ray image at a first pixel density in the first position and a lower-resolution digital x-ray image at a second pixel density in the second position.

2. The multi-resolution x-ray image capture apparatus of claim 1, further comprising a mirror, wherein the lower-resolution digital x-ray image is obtained via reflection by the mirror.

3. The multi-resolution x-ray image capture apparatus of claim 2, wherein the accumulator is configured to focus photons reflected by the mirror on an imaging acquisition device of the imaging sensor.

4. The multi-resolution x-ray image capture apparatus of claim 3, wherein the imaging acquisition device is a charged coupled device (CCD).

5. The multi-resolution x-ray image capture apparatus of claim 2, wherein the high-resolution digital x-ray image is obtained via reflection by the mirror.

6. The multi-resolution x-ray image capture apparatus of claim 1, further comprising an fiber-optic coupler coupled between the imaging sensor and the accumulator.

7. The multi-resolution x-ray image capture apparatus of claim 1, wherein the position of the accumulator is adjusted in response to a repositioning of the image capture assembly.

8. The multi-resolution x-ray image capture apparatus of claim 1, wherein the focus adjustment mechanism is configured to adjust the position of the accumulator to a third position, where the imaging sensor is configured to acquire a digital x-ray image at a third pixel density in the third position.

9. A multi-resolution x-ray capture system, comprising:
   a multi-resolution x-ray image capture assembly comprising:
      an imaging sensor;
      an accumulator; and
      a focus adjustment mechanism configured to adjust a position of the accumulator between a first position and a second position; and
   a processor system configured to receive a digital x-ray image from the imaging sensor, the digital x-ray image having a first high-resolution pixel density when the accumulator is in the first position and a second lower-resolution pixel density when the accumulator is in the second position.

10. The multi-resolution x-ray capture system of claim 9, wherein the processor system is further configured to control adjustment of the position of the accumulator.

11. The multi-resolution x-ray capture system of claim 10, wherein the position of the accumulator is adjusted based at least in part upon feedback from the multi-resolution x-ray image capture assembly.

12. The multi-resolution x-ray capture system of claim 10, wherein the position of the accumulator is adjusted by repositioning the multi-resolution x-ray image capture assembly.

13. The multi-resolution x-ray capture system of claim 9, wherein the processor system is further configured to:
   activate an x-ray source; and
   trigger the imaging sensor to capture the digital x-ray image.

14. The multi-resolution x-ray capture system of claim 13, wherein the multi-resolution x-ray image capture assembly further comprises a detection device configured to indicate when the x-ray source is activated.

15. The multi-resolution x-ray capture system of claim 13, wherein the processor system is further configured to:
  process the digital x-ray image; and
  provide the processed x-ray image for rendering on a display device.

16. The multi-resolution x-ray capture system of claim 15, wherein the digital x-ray image is processed to enhance contrast.

17. The multi-resolution x-ray capture system of claim 9, wherein the multi-resolution x-ray image capture assembly further comprises:
  a screen configured to convert incident x-rays from an x-ray source into photons of light; and
  a mirror configured to reflect photons from the screen toward the accumulator.

18. A non-transitory computer readable medium having a program that, when executed by a processor system, causes the processor system to:
  reposition an image capture assembly of an x-ray image capture apparatus from a first position to a second position, the first position corresponding to a first pixel density resolution and the second position corresponding to a second pixel density resolution;
  activate an x-ray source; and
  obtain a digital x-ray image from an imaging sensor of the image capture assembly, the digital x-ray image having the second pixel density resolution.

19. The non-transitory computer readable medium of claim 18, wherein the program, when executed by the processor system, causes the processor system to initiate capture of the digital x-ray image by the imaging sensor in response to an indication of x-ray source activation.

20. The non-transitory computer readable medium of claim 18, wherein the program, when executed by the processor system, causes the processor system to:
  process the digital x-ray image; and
  provide the processed x-ray image for rendering on a display device.

* * * * *